Oct. 31, 1967   F. SEALEY   3,350,237
METHOD OF MAKING ELECTRIC STORAGE BATTERIES
Filed Dec. 3 1965   2 Sheets-Sheet 1

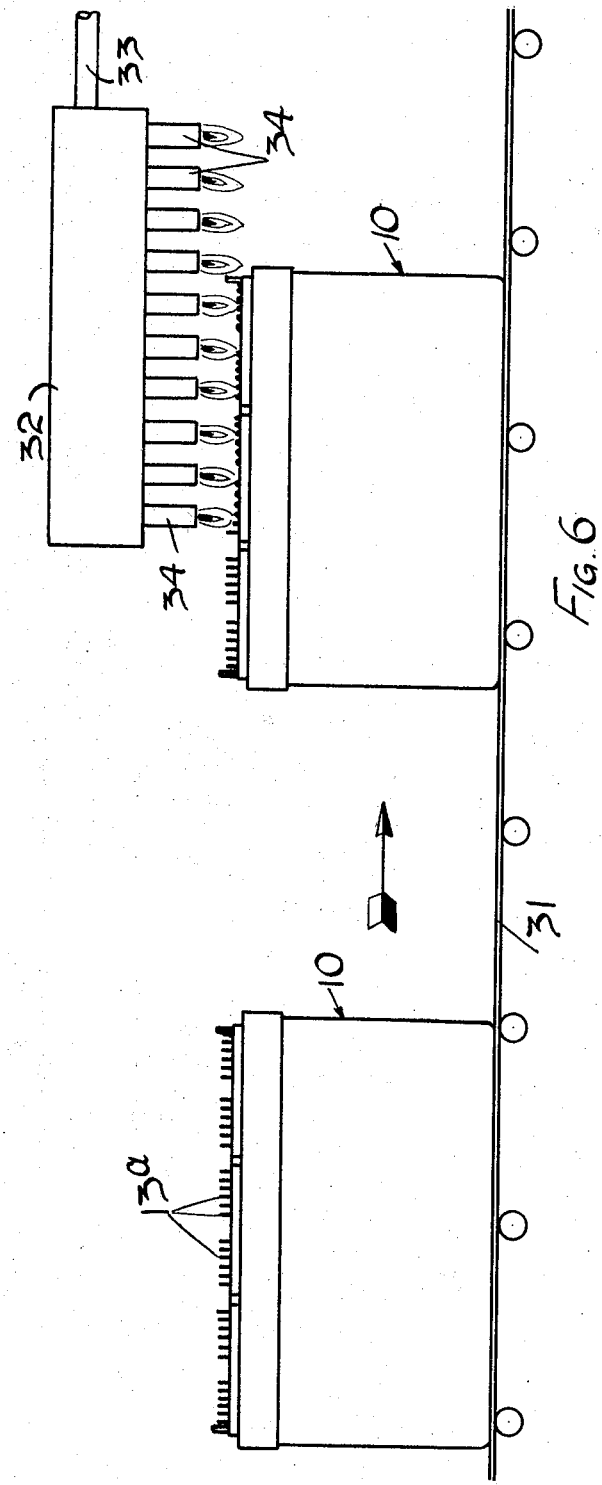

United States Patent Office 3,350,237
Patented Oct. 31, 1967

3,350,237
METHOD OF MAKING ELECTRIC STORAGE
BATTERIES
Frank Sealey, Birmingham, England, assignor to Joseph
Lucas (Industries) Limited, Birmingham, England
Filed Dec. 3, 1965, Ser. No. 511,540
Claims priority, application Great Britain, June 12, 1962,
22,477/62
5 Claims. (Cl. 136—176)

This is a continuation-in-part of application Ser. No. 286,583, filed June 10, 1963, which is now abandoned.

The object of this invention is to provide a convenient method of manufacturing an electric storage battery of the kind comprising a plurality of secondary cells connected in series, each secondary cell including a plurality of plates spaced apart by separators.

A method in accordance with the invention comprises placing in each compartment of a battery box an assembly of plates spaced apart by separators, each plate having a lug projecting above the level of the box, placing protectors over the separators, placing the battery box on a conveyor belt which moves past a flame which is spaced from the battery box so as not to damage the battery box, said flame melting the lugs to form strips connecting the plates in each secondary cell in parallel, and also connecting the secondary cells in series, the strips extending above the level of the box, and closing the box with a dished lid having partitions mating with the partition walls of the battery box, but recessed to accommodate the strips, a seal between the lid and the box being made with material which is resistant to attack by the acid used in the battery.

An example of the invention is illustrated in the accompanying drawings as applied to a twelve-volt battery having six battery compartments. However, in order to simplify the drawings only the two compartments at one end of the battery box are shown.

Figure 3:
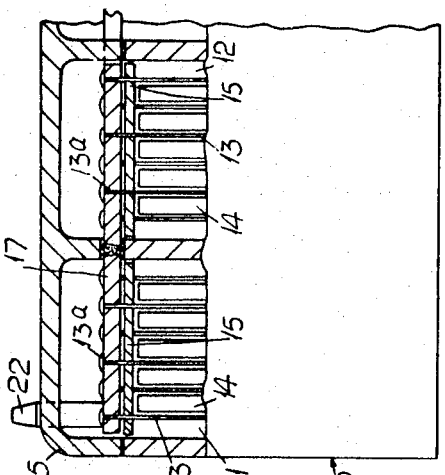
Figure 2:
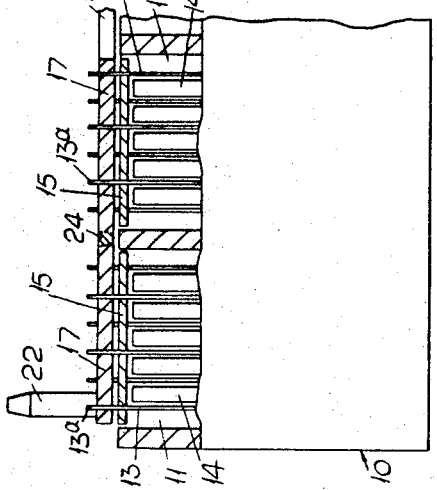
Figure 5:
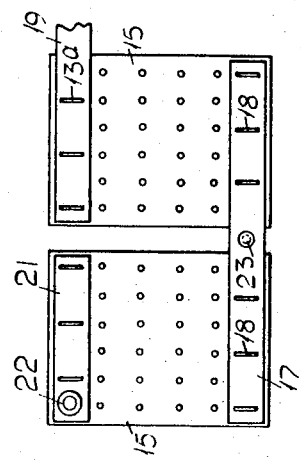
Figure 1:
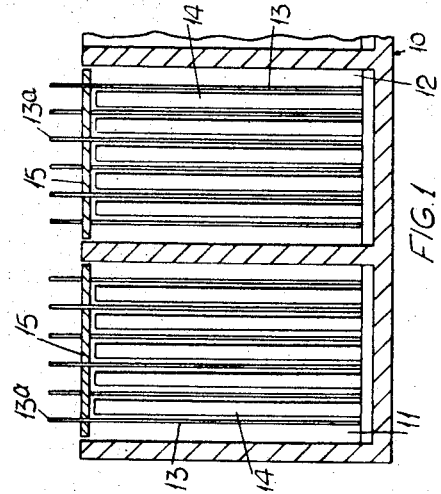
Figure 4:
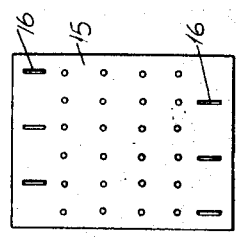

In the drawings, FIGURES 1, 2 and 3 illustrate respectively three stages during the manufacture of a battery whilst FIGURE 4 is a plan view of a separator protector, FIGURE 5 is a plan view illustrating the interconnection of the battery plates, and FIGURE 6 is a diagrammatic view illustrating the melting of the lugs.

Referring to the drawings, two of the six compartments of the battery box 10 are shown at 11 and 12. Within each compartment there is placed an assembly of battery plates 13 spaced apart by separators 14, each battery plate having an integral lug 13a which projects above the level of the outer and partition walls of the battery box 10. In the first compartment 11 and the third and fifth compartments the odd-numbered plates have their lugs at one side of the box and the even-numbered plates have their lugs at the other side of the box. However, in the second compartment 12 and the fourth and sixth compartments the even-numbered plates have their lugs at said one side of the box and the odd-numbered plates have their lugs at said other side of the box.

Perforated protectors 15 are placed over the separators in each compartment, the protectors having slots 16 through which the lugs 13a pass as shown in FIGURE 1. The plates are then joined in the following manner: a lead bar 17 is placed over the lugs at said one side of the first and second compartments 11, 12 the bar having therein slots 18 through which the lugs 13a project. As shown in FIGURE 2 the arrangement is such that the bar extends over the partition wall between the first and second compartments, but is spaced therefrom. The lugs are now melted and form with the plate a connecting strip electrically connecting the plates in the first and second compartments as shown in FIGURE 3.

The way in which the lugs 13a are melted is an all-important part of the present invention, and is illustrated in FIGURE 6. After the stage shown in FIGURE 2, the battery boxes 10 are placed on a conveyor belt 31 which moves in the direction indicated by the arrow past a lug melting frame 32. The frame 32 has a gas inlet 33 communicating with a plurality of nozzles 34 producing flames under which the boxes 10 move. The flame length is adjusted so that the flames do not act on the battery box, which therefore is undamaged. However, the flames impinge upon the lugs 13a to melt them and form the required interconnections.

The conveyor belt technique illustrated is possible because the lugs 13a project above the level of the battery box 10. In conventional techniques for producing a battery, the lugs do not extend above the level of the battery box, and so any attempt to use the technique shown in FIGURE 6 would result in damage to the battery box by the flames. This problem can be overcome by making the connections with great care by hand while the plates are in the battery box, this procedure is tedious and the more usual technique is to transfer the plates to a separate jig, melt them more or less as shown in FIGURE 6, and then return the plates to the battery box. The technique of the present invention enables the box 10 to be used as the jig, with obvious advantages.

Similar connections are made at said one side of the box between the third and fourth compartments and the fifth and sixth compartments. Moreover, at said other side of the box connections are made between the second and third compartments, part of the bar 19 for this purpose being shown in FIGURE 5, and the fourth and fifth compartments. Also, the lugs at said other side of the box in the first and sixth compartments are connected in a manner similar to that described above to lead bars incorporating terminal posts, the bar in the compartment 11 and its associated post being shown at 21 and 22 respectively.

The lead bars such as 17 which extend over the partition walls are moulded with holes 23 (FIGURE 5) which lie above the partition walls. While the lugs 13a are being melted, each hole 23 is closed by a steel plug 24 (FIGURE 2) which does not melt itself, and prevents molten lead from flowing into the holes 23. After the lugs 13a have been melted, the plugs 24 are removed and the tops of the partition walls are covered with material which will resist attach by the acid used in the battery, this material being inserted through the holes 23. The tops of the outermost walls of the battery box are also coated with the material and the box is then closed permanently by a dished lid 25 (FIGURE 3) having partitions which mate with the partitions in the box but are recessed to accommodate the bars 17. The lid 25 is also formed with a hole through which the post 22 extends. Finally, the battery is cured, and is then filled through filling holes (not shown) provided on the lid 25, there being either one hole per compartment or a single hole communicating through a channel with all the compartments.

It is most important that acid resistant material is used as specified above, because the acid level will in use be above the joint line of the lid. This is a direct result of the technique used for melting the lugs. Suitable materials are epoxy resin or a thixotropic mixture of epoxy resin and pitch.

Having thus described my invention what I claim as new and desire to secure by Letters Patent is:

1. A method of manufacturing an electric storage battery of the kind comprising a plurality of secondary cells connected in series, each secondary cell including a plurality of plates spaced apart by separators, comprising placing in each compartment of a battery box an assembly of plates spaced apart by separators, each plate having a lug projecting above the level of the box, placing protectors over the separators, placing the battery box on a conveyor belt which moves past a flame which is spaced from the battery box so as not to damage the battery box, said flame melting the lugs to form strips connecting the plates in each secondary cell in parallel, and also connecting the secondary cells in series, the strips extending above the level of the box, and closing the box with a dished lid having partitions mating with the partition walls of the battery box, but recessed to accommodate the strips, a seal between the lid and the box being made with material which is resistant to attack by the acid used in the battery.

2. A method as claimed in claim 1 in which slotted lead bars are placed over the lugs and the lugs are then melted so that they become part of the bars and so form said strips.

3. A method as claimed in claim 2 in which the bars extend over but are spaced from the partition walls of the battery box, and said material is inserted between the partition walls and bars through holes in the bars which are sealed by plugs while the lugs are being melted.

4. A method as claimed in claim 1 in which said material is epoxy resin.

5. A method as claimed in claim 1 in which said material is a thixotropic mixture of epoxy resin and pitch.

References Cited

UNITED STATES PATENTS

| 1,178,066 | 4/1916 | Gardiner | 136—134 |
| 2,637,758 | 5/1953 | Shannon | 136—176 X |
| 2,702,829 | 2/1955 | Chapel | 136—176 X |

WINSTON A. DOUGLAS, *Primary Examiner.*

D. L. WALTON, *Assistant Examiner.*